(12) United States Patent
Hirao

(10) Patent No.: US 9,799,019 B2
(45) Date of Patent: Oct. 24, 2017

(54) ORDER TERMINAL AND ORDER ENTRY SYSTEM USING SAME, AND METHOD FOR CHANGING INPUT MODE OF ORDER TERMINAL

(75) Inventor: Takuya Hirao, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 14/130,459

(22) PCT Filed: Jul. 2, 2012

(86) PCT No.: PCT/JP2012/067410
§ 371 (c)(1),
(2), (4) Date: Dec. 31, 2013

(87) PCT Pub. No.: WO2013/008766
PCT Pub. Date: Jan. 17, 2013

(65) Prior Publication Data
US 2014/0156422 A1    Jun. 5, 2014

(30) Foreign Application Priority Data

Jul. 12, 2011    (JP) ................. 2011-154170

(51) Int. Cl.
*G06Q 20/18*    (2012.01)
*G06Q 10/00*    (2012.01)
(Continued)

(52) U.S. Cl.
CPC ............ *G06Q 20/18* (2013.01); *G06Q 10/00* (2013.01); *G06Q 20/202* (2013.01); *G06Q 50/12* (2013.01); *G06Q 50/10* (2013.01)

(58) Field of Classification Search
CPC ...... G06Q 50/12; G06Q 10/087; G06Q 20/20; G06Q 30/06; G06Q 30/02
(Continued)

(56) References Cited

U.S. PATENT DOCUMENTS

| 5,124,862 A * | 6/1992 | Sawano et al. ................. 360/85 |
| 2007/0088620 A1* | 4/2007 | Tengler ............... G06Q 10/087 705/15 |

(Continued)

FOREIGN PATENT DOCUMENTS

| CN | 1838168 A | 9/2006 |
| CN | 201725333 U | 1/2011 |

(Continued)

OTHER PUBLICATIONS

International Search Report for PCT/JP2012/067410 dated Aug. 21, 2012.

(Continued)

*Primary Examiner* — Garcia Ade
(74) *Attorney, Agent, or Firm* — Sughrue Mion, PLLC

(57) ABSTRACT

Provided is an order terminal for inputting a customer's order that operates in any one of a staff mode of being operated by an employee and a customer mode of being operated by a customer as an input mode. When the employee inputs initial information on the customer in the staff mode, the input mode of the order terminal is switched over from the staff mode to the customer mode to allow the customer to input an order.

6 Claims, 7 Drawing Sheets

(51) Int. Cl.
*G06Q 20/20* (2012.01)
*G06Q 50/12* (2012.01)
*G06Q 30/00* (2012.01)
*G06Q 50/10* (2012.01)

(58) Field of Classification Search
USPC .......................................................... 705/15
See application file for complete search history.

(56) References Cited

U.S. PATENT DOCUMENTS

| | | | |
|---|---|---|---|
| 2008/0222004 A1* | 9/2008 | Pollock | G06Q 30/0603 705/15 |
| 2009/0099961 A1* | 4/2009 | Ogilvy | G06Q 20/10 705/39 |
| 2011/0055051 A1 | 3/2011 | Urushibata | |
| 2014/0244424 A1* | 8/2014 | Swinson et al. | 705/26.5 |

FOREIGN PATENT DOCUMENTS

| | | |
|---|---|---|
| JP | 2002-32863 A | 1/2002 |
| JP | 2003-6748 A | 1/2003 |
| JP | 2004-13254 A | 1/2004 |
| JP | 2004-302888 A | 10/2004 |
| JP | 2007-141120 A | 6/2007 |
| JP | 2007-299130 A | 11/2007 |
| JP | 2009-42871 A | 2/2009 |
| JP | 2009-163545 A | 7/2009 |
| JP | 2011-53825 A | 3/2011 |

OTHER PUBLICATIONS

Communication dated Sep. 28, 2014 from the State Intellectual Property Office of P.R. China in counterpart application No. 201280033409.2.

* cited by examiner (a)
FOODS

| MENU CODE | MENU NAME | PRICE (YEN) |
|---|---|---|
| 100001 | FRIED RICE | 500 |
| 100002 | GRATIN | 600 |
| 100003 | FRENCH FRIES | 300 |

⋮

(b)
DRINKS

| MENU CODE | MENU NAME | PRICE (YEN) | ALCOHOL LIMIT FLAG |
|---|---|---|---|
| 150001 | DRAFT BEER | 500 | 1 |
| 150002 | ORANGE JUICE | 600 | |
| 150003 | OOLONG TEA | 300 | |

⋮

(c)
MENU APPLICABLE FOR ALL-YOU-CAN-EAT

| MENU CODE |
|---|
| 100003 |
| 100008 |
| 100011 |
| 100015 |
| 100022 |
| 100028 |
| 100045 |
| 100055 |
| 100055 |
| 100078 |

(d)
MENU APPLICABLE FOR ALL-YOU-CAN-DRINK

| MENU CODE |
|---|
| 150002 |
| 150003 |
| 150005 |
| 150006 |
| 150008 |
| 150011 |
| 150012 |
| 150015 |

FIG. 6

ORDER TERMINAL AND ORDER ENTRY SYSTEM USING SAME, AND METHOD FOR CHANGING INPUT MODE OF ORDER TERMINAL

CROSS REFERENCE TO RELATED APPLICATIONS

This application is a National Stage of International Application No. PCT/JP2012/067410 filed Jul. 2, 2012, claiming priority based on Japanese Patent Application No. 2011-154170 filed Jul. 12, 2011, the contents of all of which are incorporated herein by reference in their entirety.

TECHNICAL FIELD

This invention relates to an order entry system for use in a shop such as a restaurant.

BACKGROUND ART

A conventional order entry system of this kind includes: a large number of handy terminals each operated by an employee, for inputting a customer's order; a kitchen printer, which is installed in a kitchen, for outputting order information on the customer; a point-of-sales (POS) terminal for performing checkout processing for the customer's order; and a management terminal for managing the customer's order, and transmitting the order information on the customer to the kitchen printer and the POS terminal. The POS terminal, the management terminal, and the kitchen printer are connected to one another through cable communications. Meanwhile, the handy terminals are connected to the system through radio communications.

For such an order entry system, a self-service order terminal (order terminal for a customer) that allows the customer to order himself/herself at each table has been developed in order to reduce labor costs and load on employees. The self-service order terminal is referred to also as "self-service terminal". In this case, in the same manner as the handy terminals, the self-service terminals are connected to the system through radio communications.

Up to now, various order entry systems have been proposed.

For example, Patent Literature 1 discloses "an order management system" capable of realizing accurate shop entry processing and improvement in quality of a service in a self-service order, in which the customer orders himself/herself, by properly using one order terminal for the customer (self-service terminal) and another order terminal for the employee (handy terminal). In the order management system disclosed in Patent Literature 1, an employee being a waiting staff performs the shop entry processing by operating a keyboard of a terminal for the employee (handy terminal), and after the shop entry processing is finished, the customer guided to a predetermined table by the employee being a waiting staff orders himself/herself by operating an operation key of an order terminal for the customer (self-service terminal) provided on the table. Further, the order is canceled by the terminal for the employee (handy terminal).

Further, Patent Literature 2 discloses "an order terminal and an order entry system" in which an order terminal for the employee being a waiting staff (handy terminal) can also be used as an order terminal for the customer (self-service terminal). In Patent Literature 2, only by connecting an RFID reader/writer to the order terminal used by the employee, the order terminal shifts to a customer mode in which a function of inputting a table code is restricted. The order terminal can shift to an "employee mode" and the "customer mode". In the "employee mode", before handing over the order terminal to the customer, the employee being a waiting staff uses the keyboard to input the table code for the customer and the number of persons. Subsequently, the order terminal is connected to the RFID reader/writer being carried around, to thereby shift to the "customer mode". Note that, the "employee mode" is referred to also as "staff mode".

Patent Literature 3 discloses "a communication device" that allows the customer to order, which can be easily introduced at a low cost. In Patent Literature 3, an application on the handy terminal is switched between an order mode for the employee and an order mode for the customer by operating an operation button unit such as by pressing any one of switching buttons set in advance. Note that, the order mode for the employee and the order mode for the customer correspond to the staff mode and the customer mode, respectively.

In addition, Patent Literature 4 discloses a handy terminal configured to selectively display, on a touch-panel display, an input screen for the employee used when the employee who takes an order inputs the order information and an input screen for the customer used when the customer inputs the order information, and to receive an input of the order information by a touch operation on the touch-panel display. In Patent Literature 4, the input screen is switched over from the input screen for the employee to the input screen for the customer by setting the handy terminal into a cradle, pressing a switching key, or turning on/off a switch. Note that, the input screen for the employee and the input screen for the customer correspond to the staff mode and the customer mode, respectively.

CITATION LIST

Patent Literature

Patent Literature 1: Japanese Unexamined Patent Application Publication (JP-A) No. 2004-13254
Patent Literature 2: Japanese Unexamined Patent Application Publication (JP-A) No. 2009-42871
Patent Literature 3: Japanese Unexamined Patent Application Publication (JP-A) No. 2011-53825 (Paragraph [0029])
Patent Literature 4: Japanese Unexamined Patent Application Publication (JP-A) No. 2007-141120 (FIG. 7, Paragraphs [0034] to [0038])

DISCLOSURE OF INVENTION

Problems to be Solved by the Invention

Patent Literatures 1 to 4 have the following problems.

In the order management system disclosed in Patent Literature 1, the handy terminal is used to perform the shop entry processing, and hence it is not possible to reduce the number of handy terminals. Further, the order terminal for the customer (self-service terminal) disclosed in Patent Literature 1 has only a function dedicated to allowing the customer to order himself/herself, and hence the self-service terminal cannot be used to input information relating to the customer who has visited the shop.

In Patent Literature 2, in order to use the order terminal for the employee (handy terminal) as the order terminal for the customer (self-service terminal), it is necessary to connect the RFID reader/writer thereto. In other words, in Patent Literature 2, in order to switch over an order input mode from the "staff mode" to the "customer mode", it is necessary to connect the RFID reader/writer to the order terminal.

Also in Patent Literature 3, in order to switch over the order input mode from the "staff mode" to the "customer mode", it is necessary to provide the switching button. Also in Patent Literature 4, in order to switch over the order input mode from the "staff mode" to the "customer mode", it is necessary to provide hardware (part) such as the cradle, the switching key, or the switch.

That is, in any one of Patent Literatures 2 to 4, in order to switch over from the "staff mode" to the "customer mode", it is necessary to provide some dedicated hardware (part).

An object of this invention is to provide an order terminal for switching over from a "staff mode" to a "customer mode" without using dedicated hardware (part), and an order entry system using the same.

Means to Solve the Problems

According to a first aspect of this invention, there is provided an order terminal for inputting a customer's order in an order entry system. The order terminal includes: a touch-panel display that inputs an order and displays data; and a control device connected to the touch-panel display, that executes a control operation. Further, the order terminal operates in any one of a staff mode of being operated by an employee and a customer mode of being operated by a customer as an input mode of the touch-panel display under control of the control device. When initial information on the customer is input in the staff mode, the control device shifts the input mode from the staff mode to the customer mode to allow the customer to input an order.

According to a second aspect of this invention, there is provided an order entry system including the above-mentioned order terminal and a management terminal that receives and manages order information on the customer.

According to a third aspect of this invention, there is provided a method of switching an input mode of an order terminal for an order entry system, the order terminal operating in any one of a staff mode of being operated by an employee and a customer mode of being operated by a customer as the input mode. The method of switching the input mode includes switching over, when initial information on the customer is input in the staff mode, the input mode from the staff mode to the customer mode to allow the customer to input an order.

According to a fourth aspect of this invention, there is provided a program for causing an order terminal for an order entry system to switch an input mode, the order terminal being realized by a computer and operating in any one of a staff mode of being operated by an employee and a customer mode of being operated by a customer as the input mode. The program causes the order terminal to realize a function of, when initial information on the customer is input in the staff mode, switching over the input mode from the staff mode to the customer mode to allow the customer to input an order.

Effect of the Invention

According to this invention, it is possible to switch over from the "staff mode" to the "customer mode" with the order terminal used in the order entry system without using dedicated hardware (part).

BRIEF DESCRIPTION OF THE DRAWINGS

FIG. 6 is tables showing a menu master stored in the management terminal used in the order entry system illustrated in FIG. 1.

EMBODIMENTS FOR CARRYING OUT THE INVENTION

Next, exemplary embodiments for carrying out the invention are described in detail with reference to the accompanying drawings.

Figure 1:
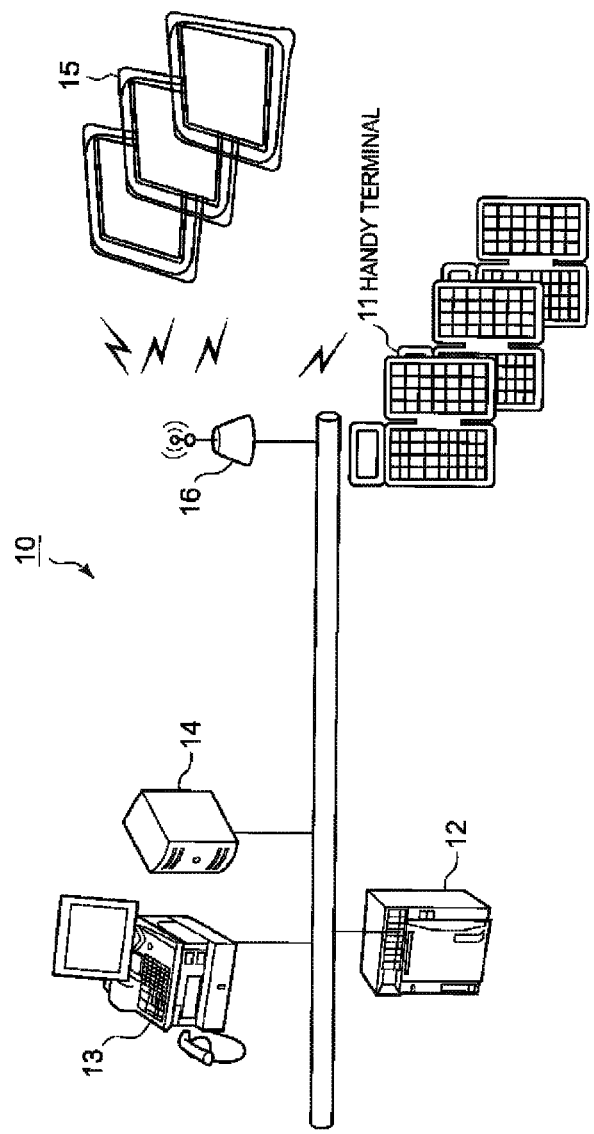
FIG. 1 is a block diagram illustrating an order entry system according to a first embodiment of this invention.

Referring to FIG. 1, a description is made of an order entry system 10 according to a first embodiment of this invention.

The order entry system 10 is an order entry system used in a shop such as a restaurant. The order entry system 10 includes: a plurality of handy terminals 11 operated by an employee, that input a customer's order; a kitchen printer 12 installed in a kitchen that outputs order information on the customer; a point-of-sales (POS) terminal 13 that performs checkout processing for the customer's order; a management terminal 14 that manages the customer's order and transmits the order information on the customer to the kitchen printer 12 or the POS terminal 13; and a plurality of self-service terminals 15 that each allow the customer to order himself/herself.

In the first embodiment, part of operations for managing the customer, which have been performed by the handy terminal 11 up to now, is performed by the self-service terminal 15. Therefore, it is possible to reduce the number of handy terminals 11.

The self-service terminal 15 is basically an order terminal that serves to be operated by the customer himself/herself, and hence an operation such as management of checkout information needs to be performed by using the handy terminal 11 or the POS terminal 13. Specifically, operations such as canceling the order or moving the customer to a different seat are performed by using the handy terminal 11 or the POS terminal 13.

Figure 7:
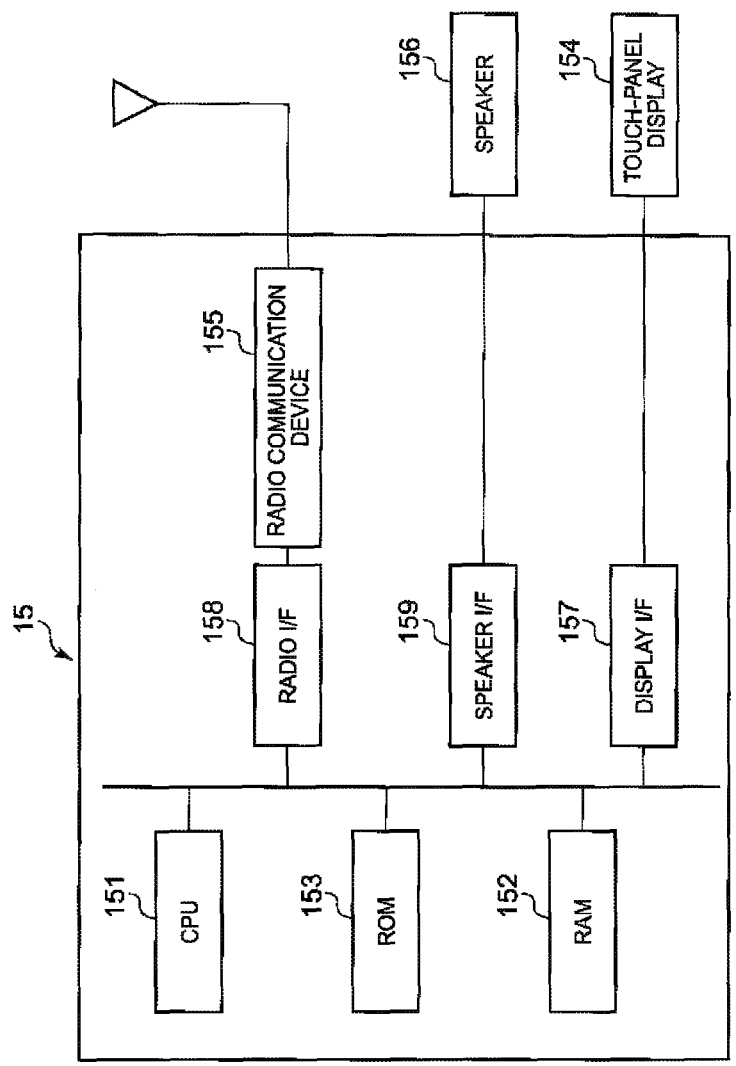
FIG. 7 is a block diagram for illustrating an example of a configuration of the self-service terminal included in the order entry system illustrated in FIG. 1.

Referring to FIG. 7, a description is made of the self-service terminal 15. The self-service terminal (order terminal) 15 can be realized by a computer. As illustrated in FIG. 7, the computer includes a control device (central processing unit: CPU) 151, a storage device (RAM) 152 that stores data, and a memory (ROM) 153 for a program that stores a program for executing a control operation performed by the control device 151. The self-service terminal (order terminal) 15 further includes a touch-panel display (input/output device) 154 that inputs data and outputs (displays) data and a radio communication device 155 that performs radio communications to/from a radio base station 16 (FIG. 1). The self-service terminal 15 may further include a speaker 156. The touch-panel display 154, the radio communication device 155, and the speaker 156 are connected to a bus via a display interface 157, a radio interface 158, and a speaker interface 159, respectively, and further connected to the control device 151.

Figure 2:
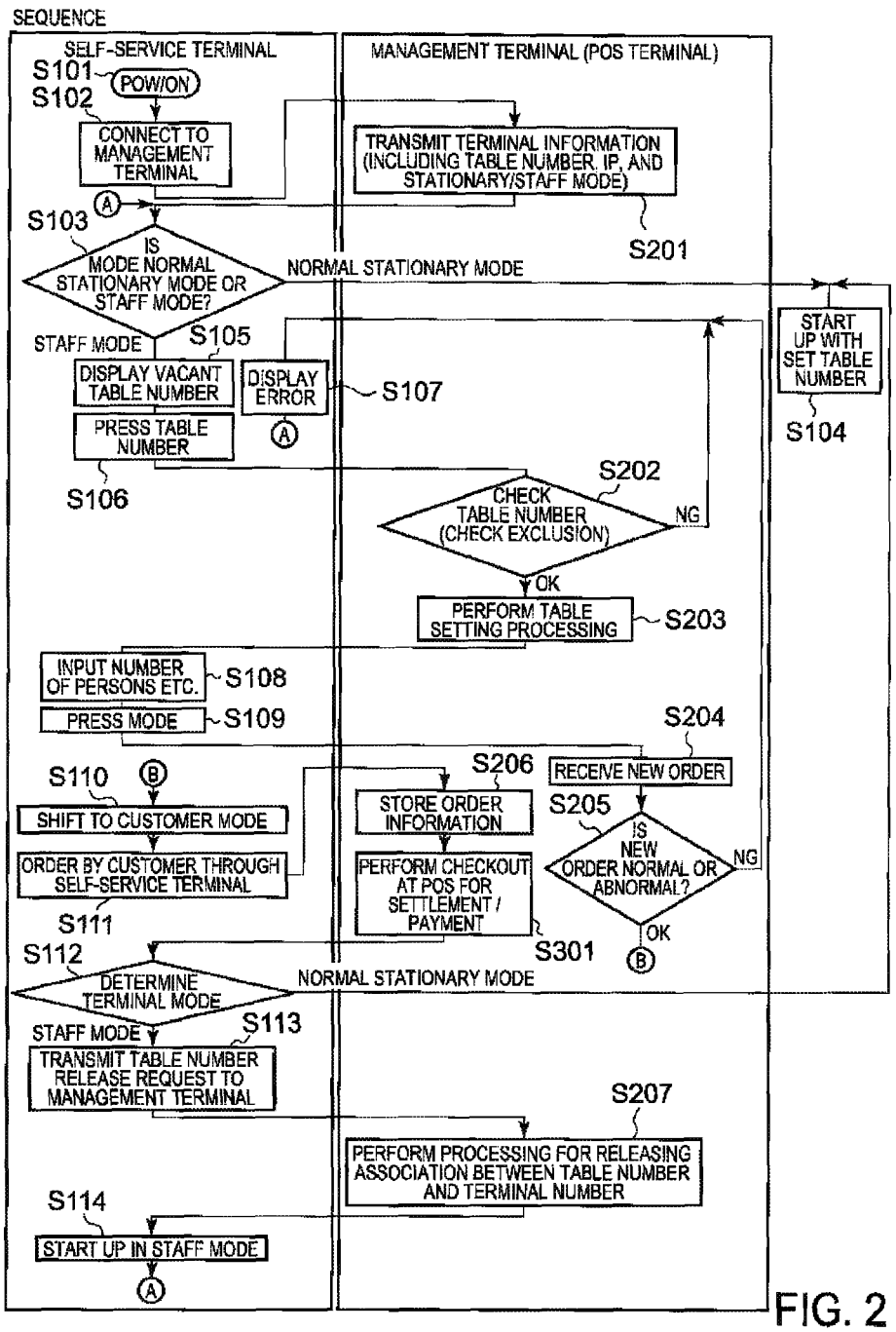
FIG. 2 is a sequence diagram for illustrating operations of a self-service terminal, a management terminal, and a POS terminal that are included in the order entry system illustrated in FIG. 1.

The control device 151 executes such an operation as illustrated in the left part of the sequence diagram of FIG. 2 by reading the program stored in the memory (ROM) 153 for the program. That is, Step S101 to Step S114 illustrated in FIG. 2 are executed under the control of the control device 151.

The self-service terminal 15 is an order terminal that can be used by switching between a "staff mode" and a "customer mode". The staff mode represents a mode of being operated by the employee, and the customer mode represents a mode of being operated by the customer. The self-service terminal 15 includes the touch-panel display 154. The touch-panel display 154 is referred to also as "self-service screen". In the staff mode, the touch-panel display (self-service screen) 154 becomes an input screen for the employee that allows the employee to input initial information (described later) on the customer. On the other hand, in the customer mode, the touch-panel display (self-service screen) 154 becomes an input screen for the customer that allows the customer to input the order information.

The POS terminal 13, the management terminal 14, and the kitchen printer 12 are connected to one another through cable communications. On the other hand, the handy terminal 11 and the self-service terminal 15 are connected (coupled) to the system via the radio base station 16.

Note that, a kitchen display for displaying the order information on the customer may be used in place of the kitchen printer 12. Further, the management terminal 14 may be excluded when the POS terminal 13 has the function of the management terminal 14.

When the initial information on the customer is input by the employee in the staff mode, the self-service terminal 15 automatically shifts from the staff mode to the customer mode. After shifting to the customer mode, the self-service terminal 15 allows the customer to input an order.

Next, referring to FIG. 2, a description is made of operations of the self-service terminal 15, the management terminal 14, and the POS terminal 13.

When the customer visits the shop, the employee at a reception desk guides the customer to a table. At this time, the employee brings the self-service terminal 15 from the reception desk to guide the customer to the table. When the self-service terminal 15 is powered on (Step S101), the self-service terminal 15 is connected to the management terminal 14 (Step S102). The management terminal 14 transmits terminal information for the self-service terminal 15 to the self-service terminal 15 (Step S201). Therefore, the self-service terminal 15 acquires its own terminal information.

The management terminal 14 stores the terminal information in which an IP number, information as to which of a normal stationary mode and the staff mode to start up in, a table number when the self-service terminal 15 starts up in the normal stationary mode, and the like are set for each terminal number.

It is assumed that the self-service terminal 15 is set to start up in the normal stationary mode as a terminal mode ("normal stationary mode" in Step S103). In this case, the self-service terminal 15 is started up with the set table number (Step S104), and the self-service terminal 15 is used as a self-service terminal. In this case, in the same manner as in a conventional technology, the initial information on the customer is input by the handy terminal 11 of the employee. After that, the customer is allowed to order by using the self-service terminal 15.

Figure 3:
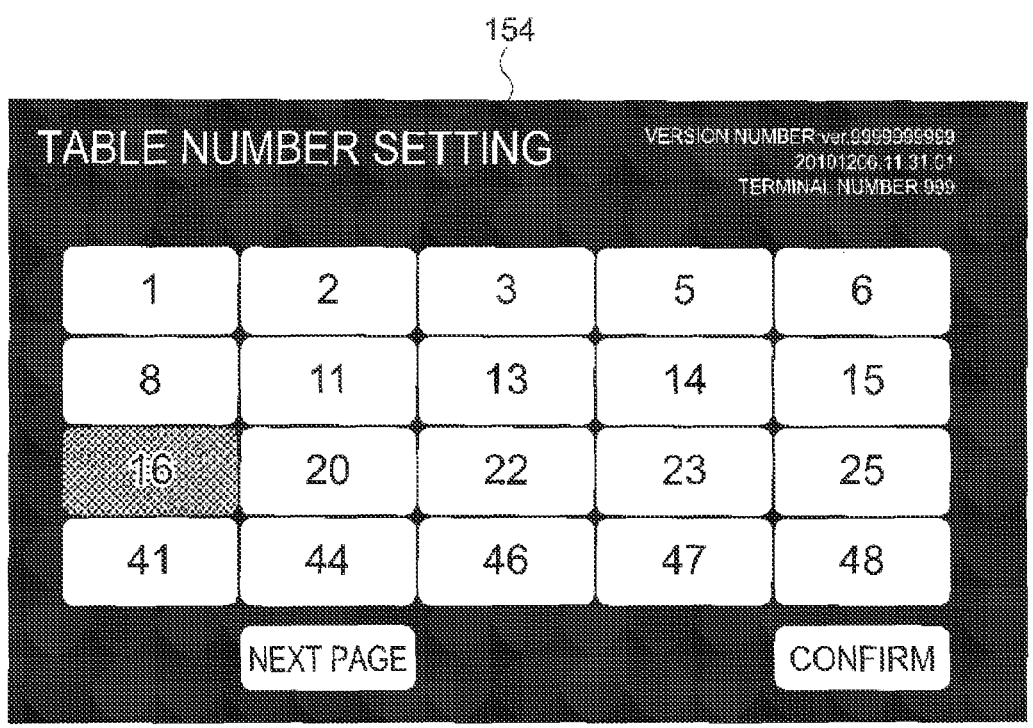
FIG. 3 is a diagram illustrating a display example of a vacant table number displayed on a touch-panel display of the self-service terminal used in the order entry system illustrated in FIG. 1.

It is assumed that the self-service terminal 15 is set to start up in the staff mode ("staff mode" in Step S103). In this case, as illustrated in FIG. 3, the self-service terminal 15 displays a vacant table number on the touch-panel display 154 (Step S105). That is, a table number that is not associated with a terminal number of a self-service terminal other than the self-service terminal 15 is displayed on the touch-panel display 154.

The management terminal 14 manages whether a table is vacant or occupied. Based on the management of the management terminal 14, the self-service terminal 15 displays the table number of a vacant table. Note that, although not shown, the self-service terminal 15 acquires information on the vacant table number from the management terminal 14 before displaying the vacant table number.

Further, in order to allow only the employee to perform an input in the staff mode, before the vacant table number is displayed on a touch-panel display, a screen for inputting a passcode or password known to only the employee may be displayed on the touch-panel display, and the vacant table number may be displayed on the touch-panel display after it is confirmed that a correct passcode or password has been input.

The employee presses any one of table numbers to select one (Step S106). In the example illustrated in FIG. 3, the employee selects a table number of "16". The selected table number is transmitted to the management terminal 14. The management terminal 14 checks the table number (Step S202). If the table number of "16" is selected by another self-service terminal earlier than selected in Step S106, which results in NG, an error is displayed on the touch-panel display of the self-service terminal 15 (Step S107), and the vacant table number is again displayed.

On the other hand, if the checking of the table number results in OK (OK in Step S202), the management terminal 14 performs table setting processing (Step S203), and associates the terminal number with the table number.

Figure 4:
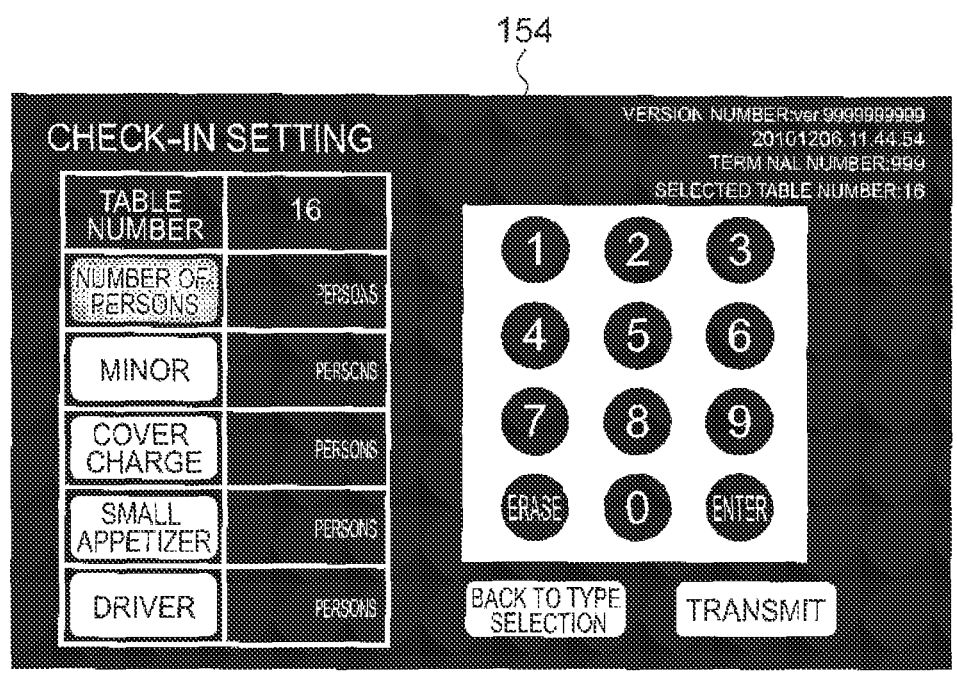
FIG. 4 is a diagram illustrating an example of a screen for inputting initial information on a customer, which is displayed on the touch-panel display of the self-service terminal used in the order entry system illustrated in FIG. 1.

After the table setting processing is performed by the management terminal 14, a screen for inputting the initial information on the customer as illustrated in FIG. 4 is displayed on the touch-panel display 154 of the self-service terminal 15, and the employee inputs the number of customers and the like (Step S108).

In FIG. 4, a "number of persons" is a field for inputting the total number of customers, a "minor" is a field for inputting the number of minors among the customers, and a "cover charge" is a field for inputting the number of adults other than children (cover charges are applicable only for adults). A "small appetizer" is a field for inputting the number of persons who are to order alcoholic liquors (small appetizers are served only for persons who order alcoholic liquors), and a "driver" is a field for inputting the number of drivers among the customers other than the minors.

Here, FIG. 4 is only an example of the screen for inputting the initial information on the customer. Therefore, the initial information on the customer is information appropriately selected depending on a category of the shop. Note that, as used herein, the "initial information on the customer" represents information to be input by the employee including the table number, which has been conventionally input by the employee using the handy terminal 11 until the customer becomes able to order with the self-service terminal.

Figure 5:
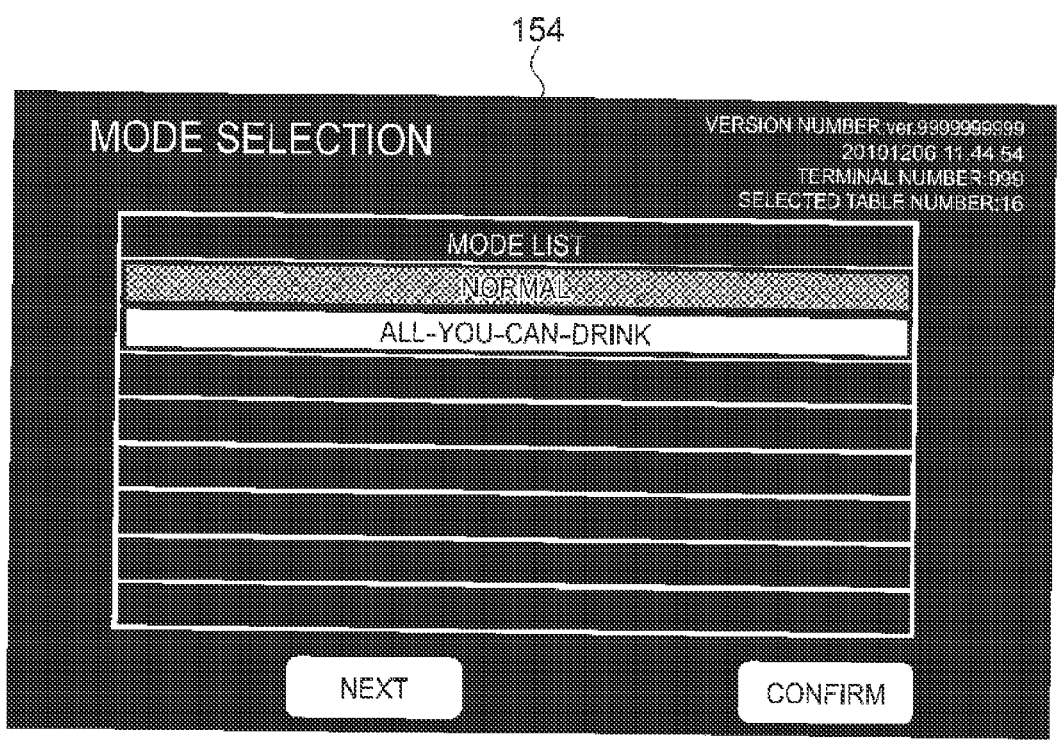
FIG. 5 is a diagram illustrating an example of a screen for selecting an eating-and-drinking mode, which is displayed on the touch-panel display of the self-service terminal used in the order entry system illustrated in FIG. 1.

After the above-mentioned number of customers and the like are input, a screen for selecting such eating-and-drinking modes as illustrated in FIG. 5 is displayed on the touch-panel display of the self-service terminal 15, and any one of the eating-and-drinking modes is pressed (Step S109).

FIG. 5 illustrates an example in which a "normal mode" and an "all-you-can-drink mode" are selectable as the eating-and-drinking modes. The "normal mode" is selected by default (initial setting). Here, the "normal mode" represents a mode in which there is no limitation on menu items that can be ordered. The "all-you-can-drink mode" represents a mode in which there is a limitation on the menu items of drinks that can be ordered. When the "all-you-can-drink mode" is selected, a limitation is placed on the drinks that can be ordered by, for example, displaying only the menu items of drinks that can be ordered on the touch-panel display of the self-service terminal 15. The initial information on the customer also includes information as to which of the "normal mode" and the "all-you-can-drink mode" has been selected.

Note that, although not shown in FIG. 5, an "all-you-can-eat mode" can be set to be selectable as the eating-and-drinking mode. The "all-you-can-eat mode" represents a mode in which there is a limitation on the menu items of foods that can be ordered. When the "all-you-can-eat mode" is selected, a limitation is placed on the foods that can be ordered by, for example, displaying only the menu items of foods that can be ordered on the touch-panel display of the self-service terminal 15. The "all-you-can-drink mode" and the "all-you-can-eat mode" are referred to collectively as "all-you-can mode".

After the eating-and-drinking mode is input, the input information is transmitted to the management terminal 14 as the initial information on the customer. In other words, the management terminal 14 accepts the received initial information on the customer (Step S204). If there is no such abnormality that the information to be input has not been input, the management terminal 14 receives the initial information on the customer as a new order taken from a new customer, and stores the initial information (OK in Step S205).

When the initial information on the customer is accepted by the management terminal 14 as the new order taken from the new customer, the self-service terminal 15 automatically shifts an input mode from the "staff mode" to the "customer mode" (Step S110), and the customer is allowed to order by using the self-service terminal 15 (Step S111).

Note that, in FIG. 2, an order is taken by the self-service terminal 15, and the order information is described only once, but if a plurality of orders are taken from the customer, this process is repeated a plurality of times. The customer's order is managed in association with the table number.

The management terminal 14 stores the order information (Step S206).

When the self-service terminal 15 or the handy terminal 11 gives an instruction to perform checkout, checkout processing is performed on the POS terminal 13 (Step S301).

When the checkout processing is finished, the self-service terminal 15 determines the terminal mode (Step S112). When the terminal mode is the "normal stationary mode" ("normal stationary mode" in Step S112), the self-service terminal 15 starts up with the set table number (Step S104). When the terminal mode is the "staff mode" ("staff mode" in Step S112), the self-service terminal 15 transmits a table number release request to the management terminal 14 (Step S113). In response to this table number release request, the management terminal 14 performs processing for releasing the association between the table number and the terminal number (Step S207).

After the processing for releasing the association is performed by the management terminal 14, the self-service terminal 15 starts up in the staff mode (Step S114).

In this manner, the self-service terminal 15 is the order terminal that allows the customer himself/herself to input goods to order. When the minor or the driver enters the shop as the customer, there is a case where the alcoholic liquors may be served to them inadvertently.

In the conventional order entry system, such a case is hardly missed because the employee comes to the seat for every order taking and takes an order while having a conversation.

However, in the order entry system into which the self-service terminal 15 is introduced, a case where such a case is missed may increase because the employee simply delivers the goods ordered to the seat.

Stores are raising awareness or performing other such activities, but in terms of a serving time or the number of employees, it is difficult for the employee to ask the customer whether or not he/she is under age or a driver every time the goods ordered are provided.

Therefore, in the order entry system 10 according to the first embodiment, the employee confirms in advance the number of minors and the number of drivers when the customer enters the shop and uses the self-service terminal 15 to input the number of minors and the number of drivers (see Step S108 in FIG. 2 and FIG. 4).

The number of persons is input only once as an input matter for shifting the self-service terminal 15 to the customer mode, and hence it is easy for the employee to ask the customer without such annoyance as to confirm the number of persons every time the goods ordered are provided to the seat. Accordingly, in relation to provision of services, it is possible to enhance corporate values such as legal compliance and respect for human life.

A specific calculation expression is as follows:

if (number of customers)>[(number of minors)+ (number of drivers)], there is no limit to the provision of goods; and if (number of customers)=[(number of minors)+ (number of drivers)], there is a limit to the provision of goods.

FIG. 6 are tables showing a menu master stored in the management terminal 14. FIG. 6(a) shows the menu of foods, FIG. 6(b) shows the menu of drinks, FIG. 6(c) shows the menu items applicable for all-you-can-eat (that can be ordered in the "all-you-can-eat mode"), and FIG. 6(d) shows the menu items applicable for all-you-can-drink (that can be ordered in the "all-you-can-drink mode"). When the "all-you-can-eat mode" or the "all-you-can-drink mode" is selected, only the applicable menu items can be ordered by, for example, inhibiting a menu items other than the applicable menu items from being displayed.

The menu of drinks shown in FIG. 6(b) includes an alcohol limit flag field. If (number of customers)=[(number of minors)+(number of drivers)], a flag is set in the alcohol limit flag field to discriminate drinks to be limited (drinks containing alcohol). That is, a limitation is placed on the menu items of drinks that can be ordered by, for example, inhibiting a menu item with a flag set in the alcohol limit flag field from being displayed on an order screen of the touch-panel display of the self-service terminal 15.

As described above, if the "initial information on the customer" is not input by the employee, the self-service terminal does not shift to the "customer mode", and thus the customer cannot order with the self-service terminal. The input mode of the self-service terminal is inhibited from shifting to the "customer mode" if the "initial information on the customer" is not input because of the following reasons.

(1) Without the input of the information on the "cover charge" or the "small appetizer" which is necessary for the checkout, the checkout cannot be performed, causing such a trouble that the customer needs to wait for the information to be input.

(2) Without the input of the information as to which of the "normal mode" and the "all-you-can mode" is selected, the customer may order a normal menu item with an all-you-can menu item in mind, to find a difference in the price at the time of checkout, which causes a trouble.

(3) Without the input of the information on the "number of customers", the "number of minors", or the "number of drivers", there is a fear that goods that should not be provided may be provided.

The first embodiment of this invention described above produces the following effects.

A first effect is that the order terminal 15 according to the first embodiment does not need dedicated hardware (part) for switching the input mode. This is because the input mode automatically shifts from the staff mode to the customer mode when the employee inputs the initial information on the customer in the staff mode.

A second effect is that the number of handy terminals 11 can be reduced. This is because there is no need to provide a handy terminal used by the employee to input the initial information on the customer.

A third effect is that a trouble at the time of checkout can be avoided. This is because, when the customer starts to order by using the self-service terminal 15, a shift is made to the customer mode after the initial information on the customer necessary for the checkout has been input.

A fourth effect is that a trouble relating to the customer's order can be avoided. This is because the information as to which of the "normal mode" and the "all-you-can mode" is selected has been input as the initial information on the customer.

A fifth effect is that it is possible to determine the goods that cannot be provided, which can prevent the goods that should not be provided from being provided. This is because the number of customers has been input as the initial information on the customer by customer classes (including the minor and the driver).

Note that, the POS terminal 13 and the management terminal 14 can be realized by computers in the same manner as the self-service terminal (order terminal) 15 described above with reference to FIG. 7. In other words, each of the POS terminal 13 and the management terminal 14 also includes a central processing unit (CPU), a storage device (RAM) for storing data, and a memory (ROM) for a program for storing a program. The POS terminal 13 further includes an input/output device for inputting data and outputting (displaying) data.

In the above-mentioned first embodiment, the table number is input as the initial information on the customer, but the need to input the table number may be eliminated by associating the self-service terminal (order terminal) with the table number in advance. In this case, the self-service terminal is fixed to the table number that is associated therewith in advance, and thus the input of the table number and its relating processing of the self-service terminal and the management terminal become unnecessary.

A preferred embodiment of this invention is described above, but this invention is not limited to the above-mentioned embodiment. The configurations and details of this invention can be subjected to various changes that can be understood by a person skilled in the art within the scope of this invention.

For example, the order entry system 10 according to the above-mentioned first embodiment has been described by taking the example in which the total number of customers, the number of minors, and the number of drivers are input by the employee using the self-service terminal 15 in the staff mode, but those numbers of persons may be input by the employee through the handy terminal 11 in a conventional manner instead of through the self-service terminal 15. Further, in the order entry system including only the handy terminal 11 without including the self-service terminal 15, the input may be similarly performed by the employee through the handy terminal 11 in a conventional manner.

Further, the order entry system 10 according to the above-mentioned first embodiment has been described by taking the example of first inputting the number of minors among the customers and then inputting the number of drivers among the customers excluding the minors, but the number of drivers among the customers may be first input, and then the number of minors among the customers excluding the driver may be input.

This application claims priority from Japanese Patent Application No. 2011-154170, filed on Jul. 12, 2011, the entire disclosure of which is incorporated herein by reference.

REFERENCE SIGNS LIST

10 . . . order entry system
11 . . . handy terminal
12 . . . kitchen printer
13 . . . POS terminal
15 . . . self-service terminal (order terminal)
16 . . . radio base station

The invention claimed is:

1. An order entry system comprising a handy type order terminal for inputting a customer's order and a management terminal that manages order information on a customer, wherein the order terminal comprises a data input unit, a data display unit, a radio communication unit which performs radio communication with the management terminal, and a control unit which is implemented by a central processing unit (CPU) and which is connected to the data input unit, the data display unit, and the radio communication unit, the order terminal has a staff mode of being operated by an employee and a customer mode of being operated by the customer as input modes of the data input unit, when the order terminal is powered on, the control unit transmits, through the radio communication unit, only initial information on the customer, which is inputted in the staff mode and comprises at least a table number, to the management terminal, and wherein, when the initial information on the customer is received with the management terminal as a new order, the control unit shifts the input mode from the staff mode to the customer mode in the wake of the reception of the new order to allow the customer to input an order, and wherein, the management terminal stores terminal information in which a terminal mode as to which of a normal stationary mode that starts up in a table number set in advance and the staff mode to start up in, the table number when the order terminal starts up in the normal stationary mode, and the like are set for each terminal number of the order terminal, and wherein, when the order terminal is connected to the management terminal with powered on, the control unit of the order terminal acquires its own terminal information from the management terminal, when the order terminal is set so as to start up in the staff mode, the order terminal starts up with the staff mode, when the checkout processing for order items ordered after the shift from the staff mode to the customer mode is finished, the control unit of the order terminal carries out determination of the terminal mode, when the terminal mode is the staff mode, the control unit of the order terminal transmits to the management terminal a release request for releasing the association between the table number and the own terminal number, and the management terminal releases, in response to the release request, an association between the table number and a terminal number of the order terminal, which is set in the reception of the new order in the management terminal, and, after the processing for releasing the association, the order terminal starts up in the staff mode and displays a selectable vacant table number by acquiring information on the vacant table number from the management terminal.

2. The order entry system according to claim 1, wherein the order terminal has a "normal mode" and an "all-you-can mode" to be selected as an eating-and-drinking mode as the initial information on the customer, the control unit displays a screen corresponding to selection thereof on the data display unit.

3. The order entry system according to claim 1, wherein the data input unit and the data display unit are implemented by a touch-panel display, the total number of persons in a group of customers, the number of minors in the group of customers, and the number of drivers in the group of customers are input to the touch-panel display as initial information on the customer, the control unit displays a limitation on a menu on the touch-panel display when the total number of persons in the group of customers is equal to the number of persons obtained by adding the number of minors in the customers to the number of drivers in the customers.

4. A method of switching an input mode of a handy type order terminal for use in an order entry system comprising the order terminal for inputting a customer's order and a management terminal that manages order information on the customer, the order terminal being implemented by a computer which includes a central processing unit (CPU), and the order terminal having a staff mode of being operated by an employee and a customer mode of being operated by a customer as input modes of the data input unit, the method comprising:

when the order terminal is powered on, transmitting, via radio communication, only initial information on the customer, which is inputted in the staff mode and comprises at least a table number, to the management terminal, and when the initial information on the customer is received with the management terminal as a new order, the input mode is automatically shifted from the staff mode to the customer mode in the wake of the reception of the new order to allow the customer to input an order, and the management terminal stores terminal information in which a terminal mode as to which of a normal stationary mode that starts up in a table number set in advance and the staff mode to start up in, the table number when the order terminal starts up in the normal stationary mode, and the like are set for each terminal number of the order terminal, and wherein, when the order terminal is connected to the management terminal with powered on, the order terminal acquires its own terminal information from the management terminal, when the order terminal is set so as to start up in the staff mode, the order terminal starts up with the staff mode, when the checkout processing for order items ordered after the shift from the staff mode to the customer mode is finished, the order terminal carries out determination of the terminal mode, when the terminal mode is the staff mode, the order terminal transmits to the management terminal a release request for releasing the association between the table number and the own terminal number, and the management terminal releases, in response to the release request, an association between the table number and a terminal number of the order terminal, which is set in the reception of the new order in the management terminal, and, after the processing for releasing the association, the order terminal starts up in the staff mode and displays a selectable vacant table number by acquiring information on the vacant table number from the management terminal.

5. The order entry system according to claim 1, wherein the management terminal receives the initial information on the customer, determines whether there is no such abnormality that the information to be input has not been input, and accepts the received initial information as the new order if there is no abnormality.

6. The method according to claim 4, wherein the management terminal receives the initial information on the customer, determines whether there is no such abnormality that the information to be input has not been input, and accepts the received initial information as the new order if there is no abnormality.

* * * * *